United States Patent [19]

Reed

[11] Patent Number: 4,821,608

[45] Date of Patent: Apr. 18, 1989

[54] CHAIN SAW SHARPENING GUIDE

[76] Inventor: Garrett W. Reed, 18 Quick Rd., Elkview, W. Va. 25071

[21] Appl. No.: 176,978

[22] Filed: Apr. 4, 1988

[51] Int. Cl.$^4$ ............................................. B23D 63/16
[52] U.S. Cl. ......................................... 76/36; 76/46; 76/112; 33/202
[58] Field of Search ................... 76/36, 25 A, 112, 46, 76/47 B; 33/202

[56] References Cited

U.S. PATENT DOCUMENTS

| | | |
|---|---|---|
| 2,855,808 | 10/1958 | Samson . |
| 3,055,238 | 9/1962 | Hazzard . |
| 3,322,000 | 5/1967 | Newman . |
| 3,338,116 | 8/1967 | McLean . |
| 3,365,805 | 1/1968 | Carlon . |
| 3,796,113 | 3/1974 | Granberg . |
| 3,935,757 | 2/1976 | Granberg ............................. 33/202 |
| 4,404,872 | 9/1983 | Fritz . |
| 4,412,463 | 11/1983 | Beerens . |
| 4,535,654 | 8/1985 | White ................................... 33/202 |
| 4,587,868 | 5/1986 | Kuwica . |

FOREIGN PATENT DOCUMENTS 582213  8/1959  Canada ................................. 33/202

*Primary Examiner*—Roscoe V. Parker
*Attorney, Agent, or Firm*—Jim Zegeer

[57] ABSTRACT

A chain saw sharpening guide is comprised of a relatively thick rigid and rugged plate metal member which has a threaded bore to receive a micrometer-type height adjustment screw to give an accurate indication of the raker (also called depth gauge) tooth on the chain. The metal plate member is elongated and has a length spanning at least the distance between at least three consecutive teeth on the chain saw. A cut-out or notch formed on one long side of the plate member permits the plate to rest on two consecutive teeth on the same side of the chain saw with the intervening tooth on the opposite side projecting upwardly into the notch or cut-out space so that the measurements of depth of cuts skips the tooth on the opposite side of the chain and uses for the depth gauge measurement the two teeth on the same side of the chain. A sunburst angle gauge from 0 to 35 degrees (in 5 degree increment) for either the left or right tooth angles is formed in the top surface. A pivoted bar is secured to the gauge by a knurled nut to allow measurements to be made of the length of the cutter teeth.

4 Claims, 2 Drawing Sheets

CHAIN SAW SHARPENING GUIDE

BACKGROUND AND BRIEF DESCRIPTION OF THE INVENTION

There are numerous chain saw sharpening guides disclosed in the patent literature and most of these chain saw sharpening guides are made of pressed metal which require many different formations, bendings and cuttings of the metal and they are of fixed design. Moreover, these are not very accurate. The various arcs of chain bars require that a gauge be adjustable for maximum cut of the chain matched to the arc of a particular bar.

Moreover, chain saws cut with alternate teeth on the right and left sides of the chain. The tooth that precedes the raker (also called the gauge) teeth or depth gauge has more bearing on the cut of the tooth behind the raker then does the tooth on the opposite side of the claim. The present invention is designed to skip the tooth on the opposite side end engage the next tooth on the same side. However, the invention can be used to check the tooth on the opposite side at the same time; the readings will not be the same due to the arc of the bar. Finally, the invention provides a gauge which will accurately measure the length of each cutting tooth.

According to the invention, a chain saw sharpening guide is comprised of an elongated flat metal plate body member having a thickness of about $\frac{1}{8}''$ to about $\frac{1}{4}''$, preferably about 3/16 of an inch thick which has smooth planar upper and lower surfaces. This elongated flat metal plate body member has a length spanning at least the distance between three consecutive teeth on a chain saw so that the ends of the flat metal plate member rests on two consecutive teeth which are on the same side of the chain. A cut-out space or notch is formed on one long side of the elongated flat plate metal body member to permit the plate to rest on two consecutive teeth on the same side of the chain saw with their intervening tooth on the opposite side projecting upwardly freely into the notch or cut-out space. A calibrated screw is threadably engaged in threaded bore passing through the plate with the projecting end of the calibrated screw engaging the gauge or raker tooth. Calibration markings uniformly dispersed around the threaded bore on the upper surface of the plate provides an indication in thousandths-of-an-inch of the distance that the calibrated screw projects below the lower surface of the flat metal plate body member and into engagement with the gauge tooth to thereby provide an easy adjustable gauge for measuring the raker or gauge tooth.

A notch or cut-out is also provided on one end of the elongated plate member and an arm is pivotally mounted on the bar so that it projects beyond the one side of the edge and into the notch so that it can measure the length of a saw tooth between the arm and the edge of the notch.

Thus, the invention provides a chain saw sharpening guide which enables the raker or gauge teeth to be set at a proper height for maximum cut of the teeth. In tests of a new chain off the shelf. The chain saw will make cuts at a certain rate of speed. The same chain on the same saw making the same cut will cut faster after having been adjusted with the gauge of the present invention.

Most saw shops reject chains when the teeth have been sharpened back to about half of their original length. With the gauge according to the present invention a chain can be sharpened to where it has had its teeth filed back until they are almost gone. As noted above, with this gauge, the time of the cut can be shortened, thereby saving fuel and wear and tear on the engine and the chain bar and lengthening the life of the chain and saving labor thereby being more economical to use. The chain saw gauge of the present invention has a sun burst angle gauge of from 0 to 35 degrees projecting either the right or left for accurate tooth angles in increments of 5 degrees. This allow for different filing tooth angles needed by different chains and for different chain sawing applications.

BRIEF DESCRIPTION OF THE DRAWINGS

The above and other objects, advantages and features of the invention will become more apparent when considered with the following and accompanying drawings wherein.

DETAILED DESCRIPTION OF THE INVENTION

Figure 1:
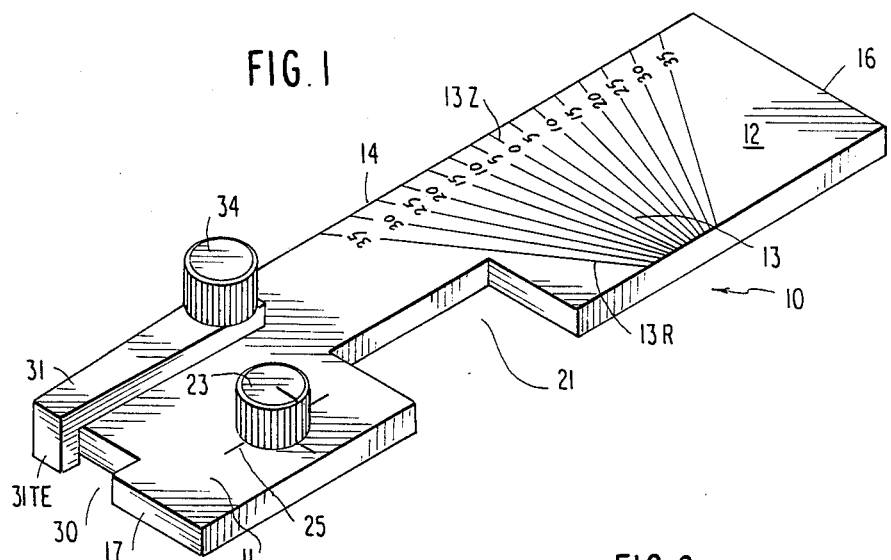
FIG. 1 is a top isometric view of a chain saw gauge incorporating the invention.
Figure 2:
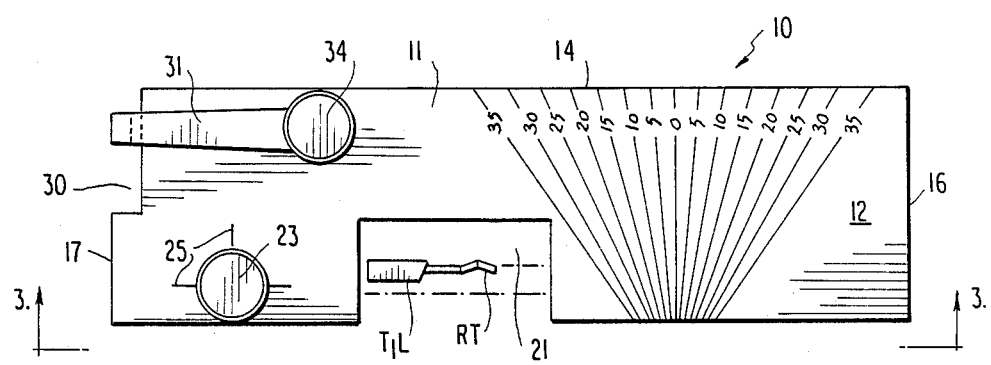
FIG. 2 is top plan view showing the measurement being made on the right side raker height.

As shown in FIG. 1, a chain saw sharpening gauge 10 incorporating the invention is constituted by an elongated flat metal plate body member 11 which, in this preferred embodiment, is about 3/16″ thick but can be from about $\frac{1}{8}''$ to about $\frac{1}{4}''$ thick. The basic object is that it be of sufficient thickness and ruggedness that it does not bend or become damaged during use or by being thrown into a tool box or the like. On the upper surface 12 is formed a sun or starburst 13 which is engraved in the upper surface with the ray lines 13R being inscribed to a predetermined depth so that a sharpening file moving thereacross does not change the readability thereof. In this respect, the flat plate metal body member can be formed of a relatively hard metal or heat treated to increase the hardness. It will be noted that the zero line 13Z is at 90 degrees to the two lateral edges 14 and 15, respectively, and is parallel to the end 16 and 17 so that the corners 18 and 19 are 90 degree angles. The elongated flat metal plate body member has a length spanning at least the distance between at three consecutive teeth on a chain saw so that at least the flat surface on the underside 20 rests on two consecutive teeth which are on the same side of the chain. (See FIGS. 3 and 5).

Figure 3:
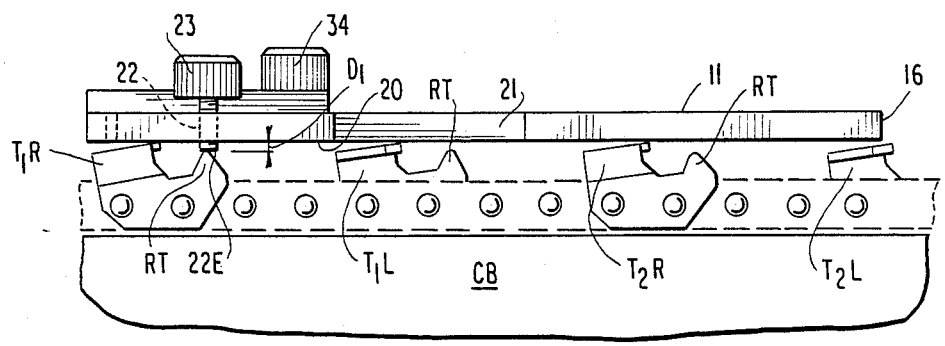
FIG. 3 is an side elevational view taken on lines 3—3 of FIG. 2.
Figure 5:
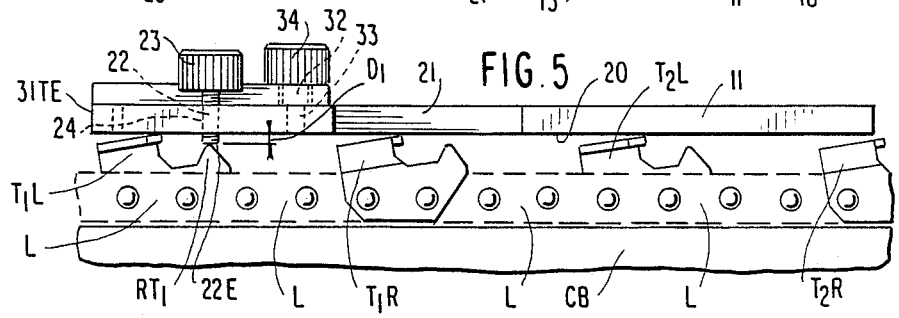
FIG. 5 is a side elevational view taken on lines 5—5 of FIG. 4.
Figure 6:
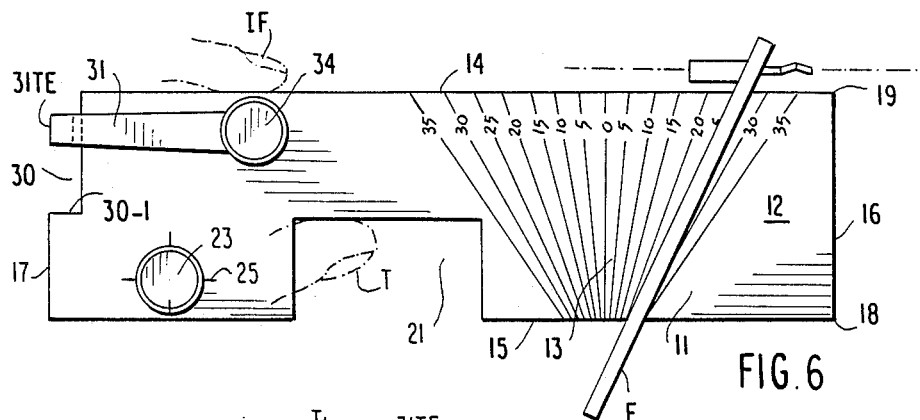
FIG. 6 illustrates use of the gauge to sharpen a tooth of the chain saw.

As illustrated in FIG. 3 and FIG. 5, a typical chain for a chain saw has cutting teeth $T_1R$, $T_2R$, $T_3R$ ... $T_NR$ on the right side of the chain alternating with cutting teeth $T_1L$, $T_2L$, $T_3L$ ... $T_NL$ on the left side of the chain which are joined by sprocket chain links, L. Each cutting tooth has a raker or gauge tooth RT preceeding it which preceeds and gauges the depth of cut of the tooth it is formed with and clears cuttings from the saw groove or cut.

A cut-out space or notch 21 permits the plate to rest on the two consecutive teeth on the same side of the chain saw with the intervening tooth on the opposite side of the chain saw projecting upwardly into the cut-out space or notch 21 and thus has no effect on the measurement in the preferred use of the instrument.

A calibrated screw thread 22 having a knurled operating knob 23 is received in a threaded bore 24 and projects measurable distance D1 below the surface 20 so that when the plate is resting on the two consecutive teeth T₁R, T₂R (two consecutive teeth on the right side of the chain) which are on the same side (right side in the case of FIG. 3 and the left side in FIG. 5) of the chain, the end 22E engages the raker tooth RT (see FIGS. 3 and 5). Calibration marking 25 provide an accurate reading of the depth of the raker or gauge tooth RT. As noted above, chain saws cuts with alternate teeth on the right and left sides. It has been found that the cutting tooth that precedes the raker or gauge tooth has more bearing on the cut of the tooth behind the raker than does the tooth on the opposite side of the chain. Therefore, the gauge is designed to skip the tooth on the opposite side and engage the next cutting tooth on the same side. However, the gauge can be used to check the tooth on the opposite side, if desired. However, the readings will not be same due to the arc of the chain bar CB.

Figure 4:
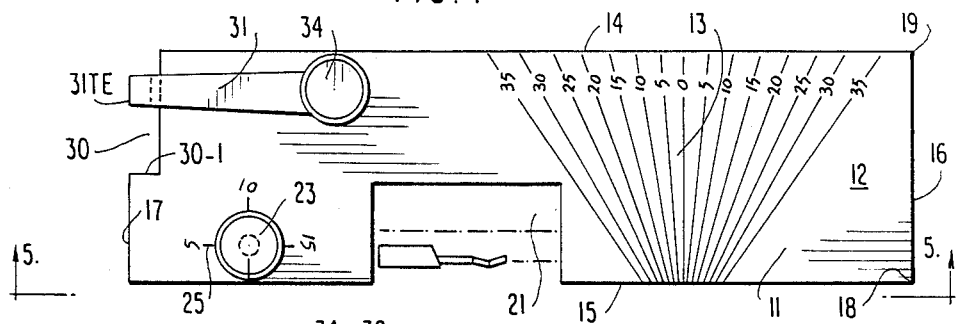
FIG. 4 is a top plan view showing the measurement being made on the chain left side raker height.
Figure 7:
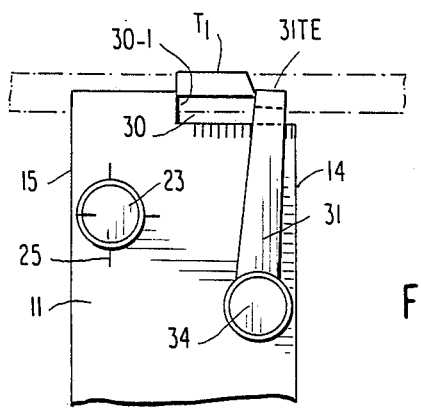
FIG. 7 illustrates measurement of the length of a tooth according to the invention.

A further notch 30 on end 17 is provided so that the length of the tooth can be checked. An arm 31 with a depending tooth engages 31TE is pivotally mounted on shaft 32 of screw 33 which is integral with a knurled knob 34. As shown in FIG. 7, knurled knob S4 is loosened to permit arm 31 to be pivoted against tooth T1 to have its length checked. One corner 30-1 of notch 30 bears against one edge of the tooth and the swinging arm 31 bears against the opposite arm and the surface along the edge 30-2 of notch 30 can have calibration markings 36 as an indication of the length of the tooth. (See FIG. 4c).

As shown in FIGS. 3 and 5, the width of the gauge permits it to be easily grasped by the hand, with thumb T (or index finger) in notch 21, and index finger IF on opposite of the chain (or the reverse, if desired) and firmly held against the chain while the tooth is filed to the desired angle, using the starburst 13 as a guide for file F. FIGS. 3 and 5 illustrate a principal feature of the invention—checking the raker or depth gauge tooth height. As the cutting teeth of the chain saw are worn down through use and/or sharpening actions, the tip of the rakes or gauge tooth no longer provide the proper depth of cut. According to the invention, significant improvements in wood cutting speed and efficiency are achieved by setting the height of the raker or depth gauge teeth at the proper height for maximum cut of the teeth. Obviously, too great a depth of cut loads the chain saw engine too much. By using two consecutive teeth on the same side (e.g. right or left side; to be engaged by planar lower side 20, the raker or depth gauge tooth can be set to set the cut for 20, 25 or 30 thousandths (other depths can be set as well but these are standard) of an inch. The intervening cutting tooth on the opposite side of the chain is positioned in the notch 21 so that it can have no effect on measurement and setting the depth of cut. The gauge 10 is reversed when setting the raker tooth depth for the opposite side and the notch 21 is positioned over the cutter teeth on the opposite side.

Thus, I have provided a simple rugged instrument which allows the chain saw sharpener to easily and quickly get the raker or gauge teeth of a chain saw at the proper height for maximum efficient cutting of wood by the cutting teeth. The guide is designed to skip the cutting tooth on the opposite side and engage the next tooth on the same side. By using the principles of the present invention, even a new chain off of the shelf will cut faster after having been adjusted with the present gauge. Chain saw gauge made of pressed metal are of a fixed design and are not very accurate and can be bent in the tool box. The various arcs of chain saw bars CB require that a gauge be adjustable for maximum cut of the chain, matched to the arc of a particular bar which is provided by the present invention. It can be used to file teeth even when most of the tooth is gone. By use of the gauge, one can shorten the time of cut, save fuel, wear and tear on the engine and bar, lengthen the life of the chain and save labor for more economical sawing.

Having disclosed and described the preferred embodiment of the invention, it is recognized that various readily apparent adaptations and modifications of it will be obvious to those skilled in the art and it is intended that such obvious modifications and adaptations as come within the spirit and scope of the claims appended hereto be included.

What is claimed is:

1. A chain saw sharpening gauge for chains having cutting teeth preceeded by gauge teeth, and alternating on each side of the chain, comprising,
    an elongated flat metal plate body member having a thicknees of about ⅛" to about ¼",
    said elongated flat metal plate body member having a length sufficient to span the distance between at least three consecutive saw teeth on a chain saw,
    said elongated flat metal plate body member having a notch formed on one side thereof to permit said elongated flat metal plate body member to engage on two consecutive teeth on the same side of said chain saw and the intervening tooth on the opposite side to project upwardly into said notch, and
    a calibrated screw threadably engaged in a threaded bore passing through said plate, said calibrated screw passing through said plate to engage said gauge tooth, calibration markings uniformly dispersed around said threaded bore on said upper surface to provide an indication, of the distance said calibrated screw projects below the lower surface of said flat metal plate body member and into engagement with said raker tooth with said flat metal plate body member engaged with said two consecutive teeth on the same side of said chain.

2. The gauge as defined in claim 1, said body member has a notch formed in one edge thereof, an arm with a depending tooth engaging portion projecting into said notch, means pivotally mounting said arm on said elongated flat plate body member so that it projects beyond said edge over said notch and can measure the length of a saw tooth between said depending tooth engaging portion and a side of said notch.

3. A gauge for sharpening chain saw teeth in which the chain is a linked sprocket chain trained about a chain saw bar and includes cutting teeth alternating on each side of said linked sprocket chain and gauge members preceding each cutting tooth, said gauge comprising,
    an elongated flat metal plate body member having a thickness in the range of about 3/16" for ruggedness, a starburst engraved in the upper surface thereof with ray lines at about 5 degree interval inscribed to a predetermined depth so that a saw file moving thereacross does not change the readability thereof, said elongated flat metal plate body member having a length spanning the distance between at least three consecutive teeth on a chain saw.

said metal plate member having a cut-out space on one side thereof to permit aid plate to rest on two teeth on the same side of said chain saw and the intervening tooth on the opposite side to project upwardly into said cut-out space, a calibrated screw threadably engaged in a threaded bore passing through said plate, said calibrated screw passing through said plate to engage said gauge tooth, calibration markings uniformly dispersed around said threaded bore on said upper surface to provide an indication, of the distance said calibrated screw projects below the lower surface of said flat metal plate body member, and into engagement with said gauge tooth, and a notch formed on a end of said plate member, an arm, means pivotally mounting said arm on said elongated flat plate body member so that it projects beyond said edge and into said notch and can measure the length of a saw tooth between said arm and a side of said notch.

4. A chain saw sharpening and gauge tooth setting method for sharpening saw teeth in which the chain saw is a linked sprocket chain trained about a curved chain saw bar and includes cutting teeth alternating on each side of said linked sprocket chain and a depth gauge tooth member preceding each cutting tooth, respectively, comprising, sharpening the cutting teeth on said chain saw, and providing an elongated flat metal plate body member of a length at least spanning the distance between at least three consecutive teeth on a chain saw so that at least the ends of said plate rest on two consecutive teeth which are on the same side of said chain, and said plate resting on said two consecutive teeth on the same side of said chain saw and having a notch above, the intervening tooth on the opposite side of said chain such that said intervening tooth has no effect on the measurement nd setting of the depth gauge tooth on the opposite side thereof, engaging the gauge tooth with a calibrated screw threadably engaged in a threaded bore passing through said plate a predetermined distance below said plate as it rests on said two consecutive teeth on the same side of said chain, and adjusting the depth of each said gauge tooth relative to its associated cutting tooth.

* * * * *